Aug. 19, 1969     R. R. HAINES     3,461,647
HEAT SEALING APPARATUS
Filed Sept. 27, 1965     2 Sheets-Sheet 1

INVENTOR
RUSSELL R. HAINES
BY
ATTORNEYS.

Aug. 19, 1969  R. R. HAINES  3,461,647
HEAT SEALING APPARATUS
Filed Sept. 27, 1965  2 Sheets-Sheet 2
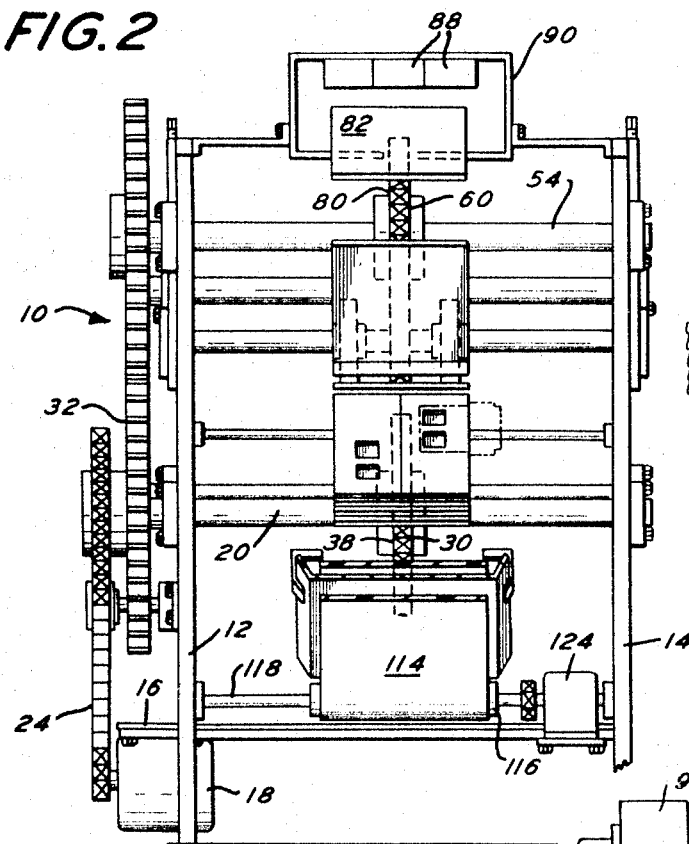
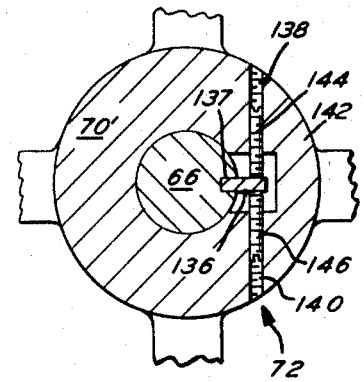
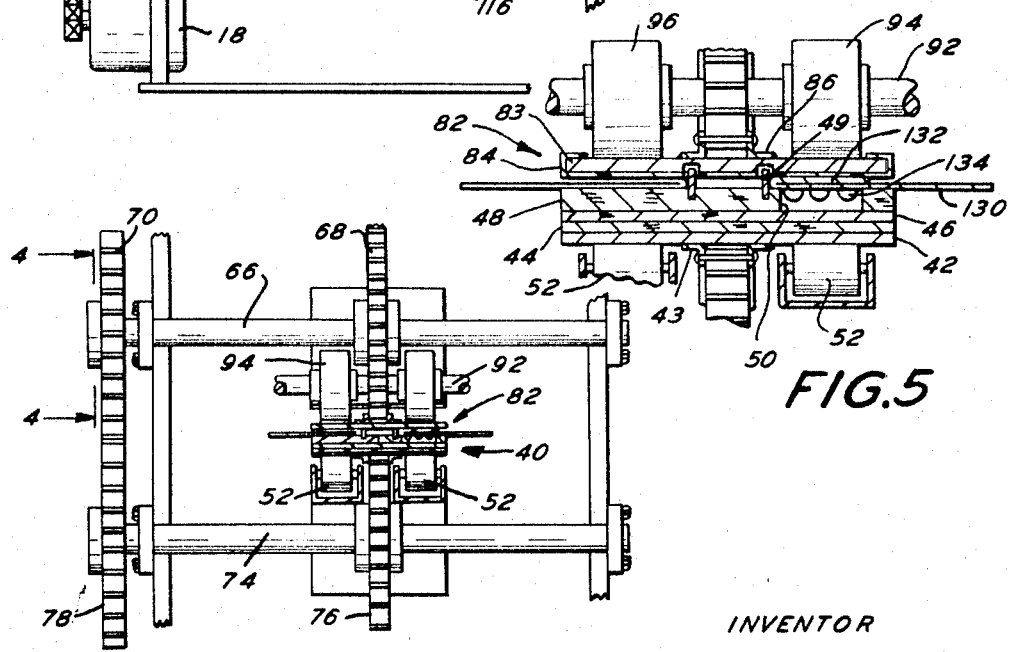
INVENTOR
RUSSELL R. HAINES
BY
ATTORNEYS.

United States Patent Office 3,461,647
Patented Aug. 19, 1969

3,461,647
HEAT SEALING APPARATUS
Russell R. Haines, Haddonfield, N.J., assignor to Paper & Corrugated Specialties Co., Pennsauken, N.J., a corporation of Pennsylvania
Continuation-in-part of application Ser. No. 185,092, Apr. 4, 1962. This application Sept. 27, 1965, Ser. No. 490,291
Int. Cl. B65b *51/18;* B65g *15/16*
U.S. Cl. 53—373                                8 Claims

ABSTRACT OF THE DISCLOSURE

Heat sealing apparatus having first and second endless conveyors, with die plate members at spaced points along one conveyor and mating platen members at spaced points along the other conveyor. At least one conveyor is driven by a gear which can be angularly adjusted with respect to its drive shaft. The platen member is provided with a cover made from a material such as Teflon. Back-up rollers are provided for each of the guide plate and platen members.

---

This is a continuation-in-part of my copending application Ser. No. 185,092, filed Apr. 4, 1962, now Patent No. 3,232,025, and entitled, "Heat Sealing Apparatus."

This invention relates to a heat sealing apparatus. More particularly, this invention relates to a heat sealing apparatus which is capable of continuously heat sealing workpieces.

A wide variety of heat sealing devices have been proposed heretofore. As a general rule, heat sealing devices apply heat and pressure to a workpiece to effect a bond between two layers of material or two portions of a single layer of material. All known heat sealing devices proposed heretofore suffer from a common defect or disadvantage, that is, the devices proposed heretofore are limited in their productive capacity. The heat sealing apparatus set forth in the above-identified copending application, through the use of endless conveyors, provides a simple solution to the shortcomings of the prior art devices. It has been found that the invention therein set forth may be used to greatest advantage in accordance with the principles hereinbelow disclosed.

In using heat sealing apparatus having continuously operative endless conveyors, it is essential that the conveyors be kept continuously in synchronous movement. The present invention provides novel means whereby conveyors may be kept in synchronous movement. It also provides means whereby a platen mounted on one conveyor and a workpiece to be heat sealed mounted on another juxtaposed conveyor may be kept in relative vertical alignment, thus insuring proper application of heat to the workpiece.

The present invention also provides a novel coating for a platen used in the heat sealing device, thus overcoming problems heretofore known in the art due to sticking of the workpiece to the platen.

It is an object of the present invention to provide a novel heat sealing apparatus.

It is another object of the present invention to provide a novel heat sealing apparatus capable of continuously heat sealing workpieces.

It is another object of the present invention to provide a novel heat sealing apparatus wherein two endless belts are juxtaposed to one another so that workpieces may be heat sealed continuously.

It is still another object of the present invention to provide a novel heat sealing apparatus wherein two juxtaposed endless belts are kept in synchronism.

It is another object of the present invention to provide a novel heat sealing apparatus wherein two juxtaposed endless belts may be adjusted to place them in synchronism.

It is yet another object of this device to provide heat sealing apparatus wherein a platen and a workpiece may be maintained in relative vertical alignment.

It is still another object of this invention to provide a novel platen construction which avoids sticking of the platen to a workpiece.

Other objects will appear hereinafter.

For the purpose of illustrating the invention, there is shown in the drawings a form which is presently preferred; it being understood, however, that this invention is not limited to the precise arrangements and instrumentalities shown.

FIGURE 2 is a view taken along the lines 2—2 in FIGURE 1.

FIGURE 3 is a view taken along the lines 3—3 in FIGURE 1.

FIGURE 4 is a view taken along the lines 4—4 in FIGURE 3.

FIGURE 5 is an enlarged view of a portion of FIGURE 3.

Figure 1:
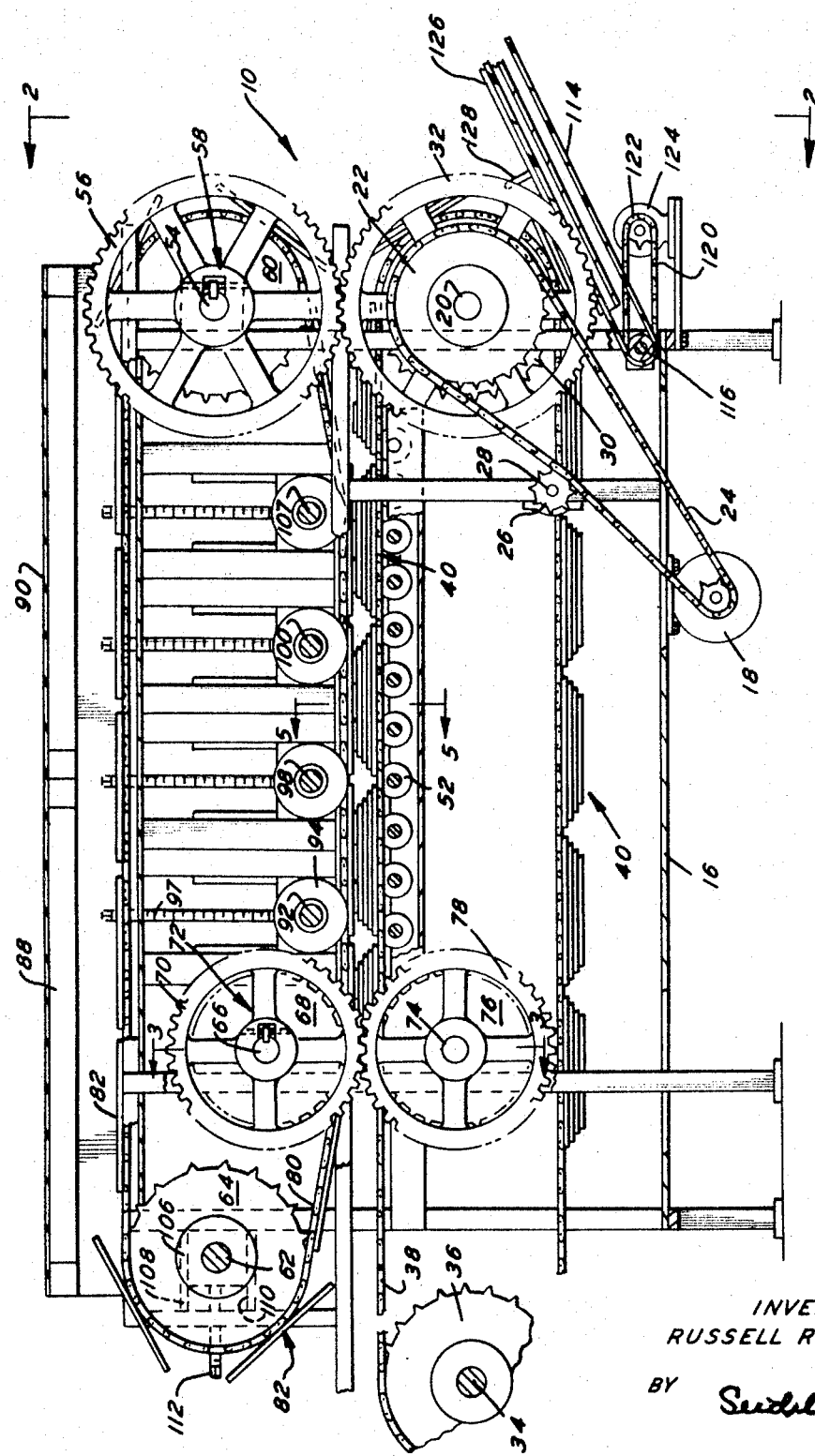
FIGURE 1 is a longitudinal sectional view of the heat sealing apparatus of the present invention.

Referring to the drawing in detail, wherein like numerals indicate like elements, there is shown in FIGURES 1 and 2 a heat sealing apparatus designated generally as 10.

The heat sealing apparatus is comprised of a pair of side frame structures 12 and 14 interconnected in any convenient manner. The side frame structures 12 and 14 are a network of reinforcement members which may have a thin outer shell or housing superimposed thereover for aesthetic purposes as well as for preventing the entrance of foreign matter into the apparatus. For the purposes of the present discussion, no such outer shell is illustrated.

The apparatus 10 is provided with a bottom wall 16 to which is secured a motor 18. A horizontally disposed shaft 20 is rotatably supported at its ends by suitable bearings secured to the side frame structures 12 and 14. A sprocket 22 is fixedly secured to the shaft 20. An endless chain 24 extends around a sprocket on the output shaft of the motor 18 and the sprocket 22.

As more clearly shown in FIGURE 1, the sprocket 22 is substantially greater in diameter than the sprocket on the output shaft of the motor 18. A shaft 28 extends horizontally between the side frame structures 12 and 14. An idler sprocket 26 is fixedly secured to the shaft 28 and is in meshing engagement with the chain 24. The idler sprocket 26 may be adjusted to maintain the tension in the chain 24.

A large sprocket 30 is fixedly secured to the shaft 20 substantially equidistant the ends of the shaft 20. The sprocket 30 is slightly larger than the sprocket 22. Also fixedly secured to the shaft 20 is a gear 32, the function of which will be made clear hereinafter. As shown at the left-hand end of FIGURE 1, a horizontally disposed shaft 34 is rotatably supported by any convenient structure such as an extension of the side frame structures 12 and 14. A sprocket 36 is fixedly secured to the shaft 34 at a point substantially equidistant its ends so as to be in line with sprocket 30. An endless chain 38 extends around the sprockets 30 and 36. A plurality of article support devices 40 are secured to the chain 38 at spaced points therealong. As shown more clearly in FIGURE 5, the lowermost layer of the article support device 40 is a metal plate 42 having one link 43 of the chain 38 fixedly secured to its lowermost surface.

A layer of wood 44 is fixedly secured to the metal plate 42. A layer of wood 46 is removably secured to the layer of wood 44 and is adapted to be separated therefrom. A die plate 48 is secured to the layer of wood 46. The die plate 48 is provided with one or more apertures 50. The purpose of the apertures will be made clear hereinafter. The die plate 48 is preferably a cork neoprene composition capable of resisting compression and heat. As a result of this composition, I have found that the hardness of the die plates increases with increases in temperature. When the work pieces to be heat sealed are sensitive, I have found it desirable to coat the die plate 48 with a white neoprene coating. The die plate 48 has on its outer face an upwardly extending projection 49, the purpose of which will be more fully described hereinafter.

As shown more clearly in FIGURES 1 and 3, a set of back-up rollers 52 are provided on opposite sides of the chain 38. Each set of back-up rollers includes a plurality of rollers rotatably supported about a horizontal axis at spaced points therealong by means of a channel member supported from one of said side frame structures 12 and 14. The lowermost surface on the metal plate 42 is adapted to be in abutting rolling engagement with the rollers of each set during a portion of the cycle wherein heat and pressure are being applied to the workpieces supported by the die plates.

As shown more clearly in FIGURES 1 and 2, a shaft 54 is rotatably supported for rotation about a horizontal axis by means of bearings supported by the side frame structures 12 and 14. A gear 56 is fixedly secured to the shaft 54. The last-mentioned gear is identical in size with the gear 12. The gears 56 and 32 are in meshing engagement. Hence, the shafts 20 and 54 will rotate at the same speed in opposite directions. A sprocket 60 is fixedly secured to the shaft 54 substantially equidistant the ends thereof so as to be in line with the sprocket 30. The sprockets 60 and 30 are identical in size.

As shown in FIGURE 3, shafts 66 and 74 are rotatably supported by end bearings mounted on the side frame structures 12 and 14. A sprocket 68 is fixedly secured to the shaft 66 substantially equidistant its ends. Also, a gear 70 is secured to the shaft 66 for rotation therewith. The shaft 74 has a sprocket 76 fixedly secured thereto substantially equidistant its ends. Also, a gear 78 is fixedly secured to the shaft 74. The sprocket 76 is in meshed engagement with the chain 38. Gears 70 and 78 are drivingly interengaged.

A shaft 62 is rotatably supported by end bearings mounted on the side frame structures 12 and 14. The shaft 62 is adapted to rotate about a horizontal axis. A sprocket 64 is fixedly secured to the shaft 62 substantially equidistant its ends. The sprocket 64 is identical in size with the sprocket 60 and is in line therewith. An endless chain 80 is in meshing engagement with the sprockets 60, 64 and 68. A plurality of platens 82 are secured to the chain 80 at spaced points therealong. The spacing between the platens 82 corresponds generally with the spacing between the metal plates 42 on the chain 38. The chains 38 and 80 are oriented so that one platen 82 will overlie one of the article support devices 40 during a portion of the cycle.

The platens 82 are preferably heat sinks. In order to function as heat sinks, the platens 82 may be made from steel or other materials having suitable heat storage and heat transfer properties. As is more clearly shown in FIGURE 5, the platens 82 comprise a base portion 83 and an outer cover member 84. The outer cover member 83 must be of heat resistant, chemically inert, relatively hard material. The outer cover member 84 may also be advantageously made of a plastic material having self-lubricating properties, in which case it has been found that a workpiece will not have a tendency to stick to the outer cover member. Suitable materials for the outer cover member are polytetrahaloethylene synthetic resins such as polytetrafluoroethylene which is sold commercially by the E. I. du Pont de Nemours & Company under the name of "Teflon." It has been found that a combination of glass fibers and "Teflon" is especially useful as a material for the outer cover member 84, combining the self-lubricating properties of the "Teflon" with the hardness and durability of the glass fibers. As also appears from FIGURE 5, the lower face of the platen 83 has an indentation or slot 86 into which the aforementioned projection 49 is adapted to be received. Thus, when the platen 83 and the die block 48 are in juxtaposition, engagement of the projections 49 with the indentations or slits 86 will prevent relative sidewise movement, and will maintain the platen 83 and die block 48 in relative vertical alignment.

As shown more clearly in FIGURES 1 and 2, the platens 82 will be radiantly heated during a portion of the cycle when they are removed from the position juxtaposed to one of the article support devices 40. A bank of radiant heaters 88 is disposed within a housing 90. As the platens 82 pass below the bank of radiant heaters, they are heated to any desired temperature. The temperature to which the platens are heated may be varied by controlling the source of current for the bank of heaters and/or controlling the speed of travel of the platens 82.

As shown more clearly in FIGURE 1, a shaft 92 is rotatably supported by bearings at its terminal ends. The shaft 92 is provided with a pair of spaced pressure rollers 94 and 96. The pressure rollers 94 and 96 are vertically adjustable by means of threaded rod 97. Thus, it is possible to accommodate workpieces of varying thickness.

As shown more clearly in FIGURE 1, shaft 92 is the first pressure roller shaft beneath which workpieces will be transported. A plurality of such pressure roller shafts are provided. Hence, pressure roller shafts 98 and 100 having pressure rollers thereon are supported at spaced points in the same manner as shaft 92. As shown more clearly in FIGURE 5, the rollers on each of the pressure roller shafts will be disposed so that they apply pressure to the platens 82 in the vertical planes containing the apertures 50 and the sets of back-up rollers 52. I have found it desirable to have the axis of rotation of the various pressure roller shafts spaced apart for a distance which is less than the length of the platens 82 thereby assuring that two sets of pressure rollers will be in rolling engagement with each platen 82.

The tension in the chain 80 may be selectively varied by means of the elements illustrated in FIGURE 1. Each end of the shaft 62 may be supported in a bearing 106. The bearing 106 is slidably disposed on and guided by ribs 108 and 110. A threaded rod 112 may be in threaded engagement with a portion of the side frame structure supporting the ribs 108 and 110. One end of the threaded rod 112 may be rotatably supported by the bearing 106. As the threaded rod 112 is rotated, the bearing 106 is caused to reciprocate along the ribs 108 and 110 thereby increasing or decreasing the tension in the chain 80 depending upon the direction of rotation of the rod 112.

As is shown generally in FIGURE 1, the gears 56 and 70 and their shafts 54 and 66 are provided with angular adjustment means 58 and 72 whereby the shafts 54 and 66, and hence, the sprockets 60 and 68, may be rotated through a limited angle without interfering with the engagement of the gears. As is more clearly seen in FIGURE 4, the angular adjustment means 72 includes a key 136 which is in engagement with a keyway 137 and thus, is coupled to the shaft 66 for movement therewith. The hub portion 70' of the gear 70 is provided with internally threaded, axially aligned bores 138 and 140. The internally threaded bores 138 and 140 are separated by a clearance opening 142, into which the key 136 may extend. The internally threaded bores 138 and 140 are provided with set screws 144 and 146 which are made to extend from the threaded bores into the clearance opening 142, and to about opposite surfaces of the key 136. Thus, by adjustment of the set screws 144 and 146 the shaft 66 and sprocket 68 which is fixed to the shaft 66, are rotated with respect to the gear 70. A similar adjustment of the angular adjustment means 58 results in movement of the sprocket 60. Movement of the sprockets 60 and 68 results in a shifting of the chain 80 and its associated platens 82 with respect to the article support devices 40 and die plates 48 mounted on the chain 38. Adjustment of only one of the angular adjustment means 58 and 72 is effective to tension the chain 80 between sprockets 60 and 68.

A conveyor means may be provided to receive the heat sealed workpieces and convey the same to a remote point where other manufacturing processes such as assembling and packaging are performed. Such conveyor means may include a conveyor belt 114 extending around a roller 116. As shown more clearly in FIGURE 2, the roller 116 is supported by a rotatably mounted shaft 118. The shaft 118 has a sprocket affixed thereto. An endless chain 120 extends around the last-mentioned sprocket and sprocket 122 on the output shaft of the motor 124. Guide plates 126 are positioned on each side of the conveyor belt 114. Stripper members 128 are supported from the guide plates 126 in a position so that they automatically strip the workpieces from the support devices 40 so that such workpieces may be conveyed to a remote point by means of the belt 114.

The distance between the shafts 20 and 34 is preferably substantially larger than the distance between the shafts 54 and 62. In a working embodiment of the present invention, the distance between the shafts 20 and 34 is approximately twice the distance between the shafts 54 and 62. This enables a work assembly platform to be provided to the left of the structure illustrated in FIGURE 1. Operators may be disposed along the work assembly platform to place work pieces on the support devices 40 prior to the passage of said work pieces beneath the chain 80.

The operation of the apparatus 10 is as follows:

Prior to starting operation of the motor 18, the bank of heaters 88 is connected to a supply of current so that they attain their operating temperature. The support devices 40 in the region of the work performing platform will be provided with a work piece. For purposes of illustration, the work piece may be a paper blank 130 having a tab 132 as is more clearly seen in FIGURE 5. An article 134 to be packaged within a carton formed from the blank 130 may be disposed in a manner so that it extends from a support sheet, not shown, through an aperture in the blank 130 into the aperture 50. The support sheet for the article 134 will be between the tab 132 and the juxtaposed portion of the blank 130. The blank 130 may be of the type which is provided with a very thin transparent coating of heat sealing material capable of being bonded to itself when subjected to pressure and temperature of between 200° F. and 300° F. With the motor 18 running, it will be noted that both of the chains 38 and 80 will be moving in the same direction at the same rate of speed. With the apparatus 10 properly oriented so that each platen will be juxtaposed to one of the support devices 40 in the zone between the shafts 92 and 106, production may commence. The work pieces in the form of blanks 130 having articles 134 such as pharmaceutical products extending through an opening therein will be loaded by operators as shown in FIGURE 3. As the work pieces pass beneath the rollers on the various shafts 92, 98, 100 and 107, pressure is applied by the rollers to force the previously heated platens against the tab 132 as illustrated in FIGURE 5. The projections 49, which come into contact with the indentations or slots 86 as the platens and die plates pass beneath the rollers on the various shafts 92, 98, 100 and 106, maintain the platens and die plated in relative vertical alignment. Adjustment of the angular adjustment means prior to the commencement of operation ensures that the platens 82 and article support devices 40 will be properly juxtaposed. Also, by adjusting only one of the angular adjustment means, tension on chain 80 may be regulated. The reciprocatory mounted rotary bearings for the various roller shafts enable variations in thickness of the workpieces to be accommodated. The pharmaceutical product 134 or the like will be disposed on the support sheet, and extend into the aperture 50 in the die plate 48.

The pressure and heat are continuously applied to the workpieces until the workpieces have passed beneath the rollers on shaft 106. Thereafter, the platents 82 and support devices 40 separate as illustrated more clearly at the right of FIGURE 1.

As the platens 82 continue through their cycle, they are subjected to radiant heat as they pass beneath the bank of heaters 88. As the support devices 40 continue through their cycle, the banks 130 are removed from the above-mentioned disposition and stripped by means of the strippers 128. The blanks 130 contact the strippers 128 when the support devices 40 are substantially upright. When the workpieces are stripped from their dispositions on the die plates 48, they fall due to gravity onto the conveyor belt 114 and are conveyed to a remote location where other manufacturing steps may be accomplished. Conveyor speed, the thickness of the material of the workpieces and the length of time required to effect a heat seal are the only variables affecting the rate of production. Since the operation of the apparatus 10 is continuous, heat sealed workpieces are continuously delivered to the conveyor belt 114.

Hereinafter, the chain 38 may be referred to as a first endless conveyor having die plates thereon at spaced points therealong. Hereinafter, the chain 80 may be referred to as a second endless conveyor having platens thereon at spaced points therealong.

The present invention may be embodied in other specific forms without departing from the spirit or essential attributes thereof, and accordingly, reference should be made to the appended claims, rather than to the foregoing specification as indicating the scope of the invention.

It is claimed:

1. In apparatus comprising first and second endless conveyors juxtaposed to one another, drive means for said conveyors comprising, a pair of rotatably mounted shafts, a sprocket fixedly secured to each of said shafts and rotatable therewith, each of said sprockets being engaged with one of said first and said second conveyors, respectively, a gear secured to each of said shafts, said gears being drivingly interengaged, and angular adjustment means associated with one of said gears so that the angular disposition of said one gear may be adjusted with respect to its shaft.

2. In apparatus comprising first and second endless conveyors juxtaposed to one another, drive means for said conveyors comprising, a pair of rotatably mounted shafts, a sprocket fixedly secured to each of said shafts and rotatable therewith, each of said sprockets being engaged with one of said first and said second conveyors respectively, a gear secured to each of said shafts, said gears being drivingly interengaged, angular adjustment means associated with one of said gears so that the angular disposition of said one gear may be adjusted with respect to its shaft, and motor means associated with one of said shafts.

3. Apparatus in accordance with claim 1 wherein said second conveyor is juxtaposed in vertical relation with said first conveyor and said one gear is drivingly related with the sprocket engaged with said second conveyor.

4. Apparatus in accordance with claim 1 wherein said angular adjustment means comprises a projection coupled to one of said shafts for rotation therewith, and adjustable thread means on said gear engaging said projection.

5. In apparatus comprising first and second endless conveyors juxtaposed to one another, first and second pairs of rotatably mounted shafts, a sprocket fixedly secured to each of said shafts, each sprocket being engaged with one of said conveyors, first and second pairs of gears, each gear being secured to one of said shafts, the respective gears of each of said pairs of gears being drivingly interengaged, and angular adjustment means associated with a corresponding one shaft of each of said pairs of shafts so that the portion of said conveyors therebetween may be tensioned without interfering with the engagement of said gears.

6. Apparatus in accordance with claim 5 wherein said second conveyor is disposed above said first conveyor, and said corresponding one shaft of said pairs of shafts is connected to a sprocket engaged with said second conveyor.

7. In apparatus comprising upper and lower endless conveyors juxtaposed to one another, drive means for said conveyors including first and second pairs of rotatably mounted shafts, first and second pairs of sprockets each sprocket being fixedly secured to one of said shafts, the upper and lower sprockets of each of said pairs of sprockets being engaged with said upper and lower conveyors respectively, first and second pairs of gears, each gear being secured to one of said shafts, the respective gears of each of said pairs of gears being drivingly interengaged, thread adjustment means associated with the gears and shafts coupled to the upper conveyor so that said shafts may be angularly adjusted with respect to their gears, and power means coupled with one of said shafts to move said conveyors in the same direction at the same rate of speed.

8. Apparatus for continuously heat sealing packages comprising a first endless conveyor having a plurality of die plates thereon at spaced points therealong, a second endless conveyor above said first mentioned conveyor, said second endless conveyor having a plurality of heat sink platens at spaced points therealong, means for driving said conveyors in the same direction at substantially the same rate of speed, said means for driving each conveyor including first and second pairs of shafts, first and second pairs of sprockets, each sprocket being fixedly secured to one of said shafts, one sprocket of each of said pairs of sprockets being in engagement with said first conveyor and the other sprocket of each of said pairs of sprockets being in engagement with said second conveyor, first and second pairs of gears, each gear being secured to one of said shafts, the respective gears of each of said pairs of gears being drivingly interengaged, adjustment means associated with the gears and shafts coupled to one of said conveyors so that said shafts may be turned through a limited angle while said gears are stationary, the gears coupled to the other of said conveyors being fixedly secured to their respective shafts, an elongated projection on each of said die plates, said projection extending in the direction of movement of said conveyor, a slot on each of said platens, said slot being parallel to said projection and adapted to receive said projection so that reception of said projection in said slot maintains said die plate and said platen in relative vertical alignment.

References Cited
UNITED STATES PATENTS

| | | | |
|---|---|---|---|
| 3,151,428 | 10/1964 | Mader et al. | 53—373 |
| 3,246,448 | 4/1966 | Amic | 53—373 |
| 3,129,545 | 4/1964 | Sloan et al. | 53—184 X |
| 3,247,643 | 4/1966 | Bartelt | 53—184 X |

TRAVIS S. McGEHEE, Primary Examiner

U.S. Cl. X.R.

198—162, 208